(12) United States Patent
Huang et al.

(10) Patent No.: US 10,793,688 B2
(45) Date of Patent: Oct. 6, 2020

(54) MICROPOROUS FILMS, AND ARTICLES MADE THEREFROM

(71) Applicant: Dow Global Technologies LLC, Midland, MI (US)

(72) Inventors: Wenyi Huang, Midland, MI (US); Yijian Lin, Manvel, TX (US); Selim Bensason, Horgen (CH); Jacquelyn A. Deg root, Sugar Land, TX (US); Joseph L. Deavenport, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 118 days.

(21) Appl. No.: 16/095,810

(22) PCT Filed: May 30, 2017

(86) PCT No.: PCT/US2017/034933
§ 371 (c)(1),
(2) Date: Oct. 23, 2018

(87) PCT Pub. No.: WO2018/004920
PCT Pub. Date: Jan. 4, 2018

(65) Prior Publication Data
US 2019/0127537 A1    May 2, 2019

Related U.S. Application Data

(60) Provisional application No. 62/355,404, filed on Jun. 28, 2016.

(51) Int. Cl.
| | | |
|---|---|---|
| C08J 5/18 | (2006.01) | |
| B32B 27/32 | (2006.01) | |
| B32B 27/36 | (2006.01) | |
| B32B 27/30 | (2006.01) | |
| B32B 27/08 | (2006.01) | |
| B32B 3/26 | (2006.01) | |
| B32B 27/20 | (2006.01) | |
| B32B 27/12 | (2006.01) | |
| B32B 5/26 | (2006.01) | |
| B32B 27/28 | (2006.01) | |
| B32B 5/02 | (2006.01) | |
| B29C 55/02 | (2006.01) | |

(52) U.S. Cl.
CPC ............... *C08J 5/18* (2013.01); *B29C 55/02* (2013.01); *B32B 3/26* (2013.01); *B32B 5/022* (2013.01); *B32B 5/26* (2013.01); *B32B 27/08* (2013.01); *B32B 27/12* (2013.01); *B32B 27/20* (2013.01); *B32B 27/205* (2013.01); *B32B 27/28* (2013.01); *B32B 27/30* (2013.01); *B32B 27/302* (2013.01); *B32B 27/304* (2013.01); *B32B 27/306* (2013.01); *B32B 27/32* (2013.01); *B32B 27/36* (2013.01); *B32B 2307/724* (2013.01); *B32B 2535/00* (2013.01); *C08J 2323/06* (2013.01); *C08L 2203/16* (2013.01)

(58) Field of Classification Search
CPC ......... C08J 5/18; C08J 2323/06; B32B 27/32; B32B 27/36; B32B 27/30; B32B 27/306; B32B 27/08; B32B 3/26; B32B 27/205; B32B 27/302; B32B 27/12; B32B 27/20; B32B 5/26; B32B 27/28; B32B 27/304; B32B 5/022; B32B 2307/724; B32B 2535/00; B29C 55/02; C08L 2203/16
See application file for complete search history.

(56) References Cited

U.S. PATENT DOCUMENTS

| | | | |
|---|---|---|---|
| 3,843,761 | A | 10/1974 | Bierenbaum et al. |
| 4,138,459 | A | 2/1979 | Brazinsky et al. |
| 4,620,956 | A | 11/1986 | Hamer |
| 5,910,136 | A | 6/1999 | Hetzler et al. |
| 8,241,495 | B2 | 8/2012 | Aerts et al. |
| 2004/0146729 | A1 | 7/2004 | Ahmed et al. |
| 2005/0043450 | A1 | 2/2005 | Goodrich et al. |
| 2005/0277702 | A1 | 12/2005 | Lee et al. |
| 2007/0218271 | A1 | 9/2007 | Lee et al. |
| 2009/0011182 | A1 | 1/2009 | Mackley et al. |
| 2011/0313107 | A1 | 12/2011 | Shan et al. |
| 2013/0059100 | A1 | 3/2013 | Hlavinka et al. |
| 2014/0121344 | A1 | 5/2014 | Hlavinka et al. |
| 2015/0108127 | A1 | 4/2015 | Wang et al. |
| 2015/0274908 | A1 | 10/2015 | Yanagishita et al. |

FOREIGN PATENT DOCUMENTS

| | | |
|---|---|---|
| EP | 1691964 | 8/2006 |
| JP | 2015-134900 | 7/2015 |
| WO | 2008044122 | 4/2008 |
| WO | 2011025698 | 3/2011 |
| WO | 2012094315 | 7/2012 |
| WO | 2012094317 | 7/2012 |
| WO | 2013009538 | 1/2013 |
| WO | 2014003758 | 1/2014 |
| WO | 2014003761 | 1/2014 |
| WO | 2015/123031 | 8/2015 |
| WO | 2015/175208 | 11/2015 |
| WO | 2015/191383 | 12/2015 |

OTHER PUBLICATIONS

PCT/US2017/034933, International Search Report and Written Opinion dated Aug. 30, 2017.
PCT/US2017/034933, International Preliminary Report on Patentability dated Jan. 1, 2019.
P.C. Wu, et al., Novel Microporous Films and Their Composites, Journal of Engineered Fibers and Fabrics, 2007, pp. 49-59.

*Primary Examiner* — Michael C Miggins

(57) ABSTRACT

A microporous film comprising: 75 wt. % or greater of a high density polyethylene resin having a density of 0.957 g/cc-0.970 g/cc, a melt index of from 0.2 to 10 g/10 minutes, a molecular weight distribution, $M_{w,cc}/M_{n,cc}$, of greater than or equal to 6.0, and a $M_{z,abs}$ of greater than or equal to 500,000 g/mol, wherein the microporous film is oriented in the machine direction and exhibits a normalized water vapor transmission rate greater than 50 g mil/(100 in$^2$·day).

11 Claims, No Drawings

MICROPOROUS FILMS, AND ARTICLES MADE THEREFROM

TECHNICAL FIELD

Embodiments of the present disclosure generally relate to microporous films and applications of the microporous films to make hygiene and medical articles.

BACKGROUND

Polyethylene films are widely used in hygiene absorbent products, such as, for example, diaper backsheets. Diaper backsheets may be classified as breathable or non-breathable. Breathable films may be described as films that are permeable to water vapor and impermeable to liquid. Breathable backsheets typically use films that are filled with greater than 5 wt. % of $CaCO_3$ (or other inorganic filler) and/or microcavitated. However, vigorous competition in the hygiene absorbent product market has pushed the film manufacturers to pursue differentiating technology that enables them to reduce cost and enhance the product performance, such as, improved mechanical property performance and the ability to allow for further downgauging.

Accordingly, there is a desire to produce alternative breathable films having a very thin gauge, a high porosity to enable high water vapor transmission while preventing the leakage of liquid water, while still ensuring good processability and mechanical properties in hygiene absorbent applications.

Accordingly, alternative improved breathable films are desired.

SUMMARY

Disclosed in embodiments herein are microporous films. The microporous films comprise 75 wt. % or greater of a high density polyethylene resin having a density of 0.957 g/cc-0.970 g/cc, a melt index of from 0.2 to 10 g/10 minutes, a molecular weight distribution, $M_{w,cc}/M_{n,cc}$, of greater than or equal to 6.0, and a $M_{z,abs}$ of greater than or equal to 500,000 g/mol, wherein the microporous film is oriented in the machine direction and exhibits a normalized water vapor transmission rate greater than 50 g mil/(100 in$^2$·day).

Further disclosed in embodiments herein are breathable backsheets comprising a microporous film. The microporous films comprise 75 wt. % or greater of a high density polyethylene resin having a density of 0.957 g/cc-0.970 g/cc, a melt index of from 0.2 to 10 g/10 minutes, a molecular weight distribution, $M_{w,cc}/M_{n,cc}$, of greater than or equal to 6.0, and a $M_{z,abs}$ of greater than or equal to 500,000 g/mol, wherein the microporous film is oriented in the machine direction and exhibits a normalized water vapor transmission rate greater than 50 g mil/(100 in$^2$·day).

Further disclosed in embodiments herein are methods of manufacturing microporous films. The methods comprises providing a film comprising 75 wt. % or greater of a high density polyethylene resin having a density of 0.955 g/cc-0.970 g/cc, a melt index of from 0.2 to 10 g/10 minutes, a molecular weight distribution, $M_{w,cc}/M_{n,cc}$, of greater than or equal to 6.0, and a $M_{z,abs}$ of greater than or equal to 500,000 g/mol measured by triple detector GPC; cold stretching the film in the machine direction to a cold stretch percentage, $$\frac{\text{Total Length after Cold Stretching} - \text{Original Film Length}}{\text{Original Film Length}} \times 100\%,$$

of from 25% to 150% at a temperature ranging from 10° C. to 50° C.; after the cold stretch, hot stretching the film in the machine direction to a hot stretch percentage, $$\frac{\text{Total Length after Hot Stretching} - \text{Total Length after Cold Stretching}}{\text{Original Film Length}} \times 100\%,$$

of from 50% to 500% at a temperature ranging from 90° C. to 110° C.

Additional features and advantages of the embodiments will be set forth in the detailed description which follows, and in part will be readily apparent to those skilled in the art from that description or recognized by practicing the embodiments described herein, including the detailed description which follows, the claims. It is to be understood that both the foregoing and the following description describe various embodiments and are intended to provide an overview or framework for understanding the nature and character of the claimed subject matter. The description serves to explain the principles and operations of the claimed subject matter.

DETAILED DESCRIPTION

Reference will now be made in detail to embodiments of microporous films (hereinafter called "films") and laminates, examples of which are further described below. The films described herein are non-elastic and may be used to produce film backsheet with the right balance of stiffness, toughness, and porosity for water vapor transmission. It is noted, however, that this is merely an illustrative implementation of the embodiments disclosed herein. The embodiments are applicable to other technologies that are susceptible to similar problems as those discussed above. For example, the films may be used to produce clothlike backsheets, medical gowns, medical drapes, table covers are all clearly within the purview of the present embodiments. The film may be a monolayer film or a multilayer film. As used herein, "multilayer film" refers to a film having two or more layers that are at least partially contiguous and preferably, but optionally, coextensive. As used herein, "non-elastic" for a film refers to a film with an original length of L0, a first stretched length of L1 (where L1≥1.5×L0), and a second relaxed length after release of the stretching stress of L2, where the film is non-elastic when (L1−L2)/(L1−L0)<0.3 and elastic when (L1−L2)/(L1−L0)≥0.3.

In embodiments herein, the film comprises a high density polyethylene (HDPE). The film comprises from 75 to 100 percent, 80 to 100 percent, 85 to 100 percent, 90 to 100 percent, 95 to 100 percent, 97 to 100 percent, 99 to 100 percent, or 100 percent, by total weight of polymers present in the film, of the HDPE.

The HDPE may be an ethylene homopolymer or a copolymer of ethylene and one or more alpha-olefin comonomers. The amount of comonomer used will depend upon the desired density of the HDPE and the specific comonomers selected, taking into account processing conditions, such as temperature and pressure, and other factors such as the presence or absence of telomers and the like, as would be apparent to one of ordinary skill in the art in possession of the present disclosure. In embodiments herein, the HDPE comprises greater than 50 wt. % of the units derived from ethylene and less than 30 wt. % of the units derived from one or more alpha-olefin comonomers. In further embodiments, the HDPE comprises (a) greater than or equal to 55%, for example, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene; and (b) optionally, less than 30 percent, for example, less than 25 percent, or less than 20 percent, less than 18%, less than 15%, less than 12%, less than 10%, less than 8%, less than 5%, less than 4%, less than 3%, less than 2%, less than 1%, from 0.1 to 20%, from 0.1 to 15%, 0.1 to 12%, 0.1 to 10%, 0.1 to 8%, 0.1 to 5%, 0.1 to 3%, 0.1 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more a-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable comonomers may include alpha-olefin comonomers, typically having no more than 20 carbon atoms. The one or more alpha-olefins may be selected from the group consisting of C3-C20 acetylenically unsaturated monomers and C4-C18 diolefins. Those skilled in the art will understand that the selected monomers are desirably those that do not destroy conventional Ziegler-Natta catalysts. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene. In some embodiments, the HDPE comprises greater than 0 wt. % and less than 30 wt. % of units derived from one or more of octene, hexene, or butene comonomers.

The HDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the HDPE is made in the solution process operating in either parallel or series dual reactor mode. The catalysts used to make the HDPE described herein may include Ziegler-Natta, metallocene, constrained geometry, single site catalysts, or chromium-based catalysts. The HDPE can be unimodal, bimodal, and multimodal. Exemplary HDPE resins that are commercially available include, for instance, the UNIVAL™ DMDA-6400 NT 7 resin available from The Dow Chemical Company (Midland, Mich.). Other exemplary HDPE resins are described in U.S. Pat. No. 7,812,094, which are herein incorporated by reference.

In one exemplary embodiment, the HDPE may be made by copolymerizing ethylene and one or more alpha-olefins in the presence of a catalyst system comprised of the supported reaction product of a bis-hydrocarbylsilyl chromate and a hydrocarbylaluminum compound. The polymerization is a gas phase process. Examples of hydrocarbylaluminum compounds are described in U.S. Pat. No. 5,137,994, which is herein incorporated by reference. The bis-hydrocarbylsilyl chromate can be a bis-triarylsilyl chromate. Examples of bis-triarylsilyl chromates include bis-triphenylsilyl chromate; bis-tritolylsilyl chromate; bis-trixylylsilyl chromate; bis-trinaphthylsilyl chromate; bis-triethylphenylsilyl chromate; bis-trimethylnaphthylsilyl chromate; and bis-adamantyl chromate. Additional suitable copolymerization conditions (e.g., Al:Cr ratio, amount of catalyst, oxygen amount, hydrogen amount, ratio of comonomer to monomer, partial pressure of ethylene, polymerization temperature and pressure, etc.) are described in U.S. Pat. No. 6,022,933, which is herein incorporated by reference.

In embodiments described herein, the HDPE has a density of 0.957 g/cm$^3$ to 0.970 g/cm$^3$. All individual values and subranges of at least 0.957 g/cm$^3$ to 0.970 g/cm$^3$ are included and disclosed herein. For example, in some embodiments, the HDPE may have a density ranging from a lower limit of 0.957, 0.958, 0.960, 0.962, or 0.965 g/cm$^3$ to an upper limit of 0.968, 0.967, 0.965, 0.963, 0.962 or 0.960 g/cm$^3$. In other embodiments, the HDPE may have a density of 0.957 to 0.967 g/cm$^3$, 0.957 to 0.970 g/cm$^3$, 0.960 to 0.967 g/cm$^3$, 0.955 to 0.965 g/cm$^3$, 0.960 to 0.965 g/cm$^3$, or 0.955 to 0.963 g/cm$^3$. In further embodiments, the HDPE may have a density of 0.960-0.965 g/cm$^3$. Density may be measured in accordance with ASTM D792, Method B (Standard Test Methods for Density and Specific Gravity (Relative Density) of Plastics by Displacement).

In embodiments described herein, the HDPE has a melt index, $I_2$, of 0.2 g/10 min to 10 g/10 min. All individual values and subranges of at least 0.2 g/10 min to 10 g/10 min are included and disclosed herein. For example, in some embodiments, the HDPE may have melt index, $I_2$, ranging from a lower limit of 0.2, 0.5, 1.0, 1.5, 2.0, 2.5, 3.0, 3.4, 3.5, 4.0, or 4.5 to an upper limit of 10, 9, 8, 7, 6, 5, 4, 3, 2, 1.5, or 1.0 g/10 min. In other embodiments, the HDPE may have a melt index, $I_2$, of 0.2 g/10 min to 8 g/10 min, 0.2 g/10 min to 6 g/10 min, or 0.2 g/10 min to 5 g/10 min. In further embodiments, the HDPE may have a melt index, $I_2$, 0.2 g/10 min to 2.0 g/10 min. In even further embodiments, the HDPE may have a melt index, $I_2$, 0.2 g/10 min to 1.0 g/10 min Melt index, $I_2$, may be measured in accordance with ASTM D1238 (190° C. and 2.16 kg).

In embodiments described herein, the HDPE has a molecular weight distribution (Mw,cc/Mn,cc) of greater than or equal to 6.0. The Mw,cc is the weight average molecular weight from the conventional calibration and the Mn,cc is the number average molecular weight from the conventional calibration. All individual values and subranges of greater than or equal to 6.0 are included and disclosed herein. For example, the HDPE may have an Mw,cc/Mn,cc of greater than or equal to 65, 7.0, 7.5 or 8.0. In some embodiments, the HDPE may have an Mw,cc/Mn,cc of from 7.0 to 20.0. In other embodiments, the HDPE may have an Mw,cc/Mn,cc of from 7.0 to 15.0.

In embodiments described herein, the HDPE has a Mz,abs of greater than or equal to 500,000 grams/mol. The Mz,abs is the absolute z-average molecular weight measured by the light scattering detector. All individual values and subranges of greater than or equal to 500,000 grams/mol are included and disclosed herein. For example, the HDPE may have a Mz,abs of greater than or equal to 600,000 grams/mol. In some embodiments, the HDPE may have a Mz,abs of greater than or equal to 700,000 grams/mol. In further embodiments, the HDPE may have a Mz,abs of greater than or equal to 500,000 grams/mol to an upper limit of 2,000,000 grams/mol. In even further embodiments, the HDPE may have a Mz,abs of greater than or equal to 500,000 grams/mol to an upper limit of 1,000,000 grams/mol. In even further embodiments, the HDPE may have a Mz,abs of greater than or equal to 500,000 grams/mol to an upper limit of 800,000 grams/mol.

In further embodiments described herein, the HDPE may have greater than 5 wt. % of molecules with a molecular weight of $1 \times 10^4$ or less. In even further embodiments described herein, the HDPE may have greater than 5 wt. % to 20 wt. % of molecules with a molecular weight of $1 \times 10^4$ or less. In even further embodiments described herein, the HDPE may have greater than 6 wt. % to 20 wt. % of molecules with a molecular weight of $1 \times 10^4$ or less. In even further embodiments described herein, the HDPE may have greater than 7 wt. % to 20 wt. % of molecules with a molecular weight of $1 \times 10^4$ or less. In even further embodiments described herein, the HDPE may have greater than 10 wt. % to 20 wt. % of molecules with a molecular weight of $1 \times 10^4$ or less. In even further embodiments described herein, the HDPE may have greater than 15 wt. % to 20 wt. % of molecules with a molecular weight of $1 \times 10^4$ or less. This may be determined using conventional gel permeation chromatography.

The microporous films described herein may further comprise one or more additional polymers, such as polypropylene, propylene-based plastomers or elastomers, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, polyacrylic imides, butyl acrylates, peroxides (such as peroxypolymers, e.g., peroxyolefins), silanes (e.g., epoxysilanes), reactive polystyrenes, chlorinated polyethylene, olefin block copolymers, propylene copolymers, propylene-ethylene copolymers, ULDPE, LLDPE, HDPE, MDPE, LMDPE, LDPE, ionomers, and graft-modified polymers (e.g., maleic anhydride grafted polyethylene). The one or more additional polymers may be present in an amount of less than or equal to 25 wt. %, 20 wt. %, 15 wt. %, 12 wt. %, 10 wt. %, 8 wt. %, 5 wt. %, 3 wt. %, 2 wt. %, 1 wt. %, or 0.5 wt. %, based on the total weight of polymers present in the film.

The films described herein may be made via any number of processes. Exemplary processes may include making the film into a blown film. In some embodiments, the film may be a multilayer film. The multilayer film may be coextruded, whereby a first layer is coextruded to a second layer.

The overall thickness of the film is not particularly limited, but, in some embodiments, may be less than 20 mils. All individual values and subranges of less than 20 mils are included and disclosed herein. For example, in some embodiments, the overall thickness of the film may be less than 15 mils, 10 mils, 8 mils, 6 mils, 4 mils, 2 mils, or 1.5 mils. In further embodiments, the overall thickness of the film may be from 0.1 to 6 mils, from 0.1 to 4 mils, from 0.1 to 2 mils. In even further embodiments, the overall thickness of the film may be from 0.1 to 1.5 mils.

The films described herein are microporous having a certain pore size and porosity in order to have a normalized water vapor transmission rate of greater than 50 g·mil/100 in²·day, as measured according to ASTM D6701-01 at 38° C. and 100% relative humidity. In further embodiments, the film has a normalized water vapor transmission rate of greater than 100 g·mil/100 in²·day, as measured according to ASTM D6701-01 at 38° C. and 100% relative humidity.

The microporous films described herein are oriented in the machine direction. The microporous films may be oriented by cold stretching in the machine direction, and after the cold stretch, hot stretching in the machine direction. The cold stretch percentage may be from 25% to 150% and is determined using equation I.

$$\text{I. } \frac{\text{Total Length after Cold Stretching} - \text{Original Film Length}}{\text{Original Film Length}} \times 100\%.$$

The cold stretch may be performed at a temperature ranging from 10° C. to 50° C. The hot stretch percentage may be from 50% to 500%, and is determined using equation II.

$$\text{II. } \frac{\text{Total Length after Hot Stretching} - \text{Total Length after Cold Stretching}}{\text{Original Film Length}} \times 100\%$$

The hot stretch may be performed at a temperature ranging from 90° C. to 110° C.

In some embodiments, a method of manufacturing a microporous film comprises providing a microporous film as described herein, cold stretching the film in the machine direction to a cold stretch percentage of from 25% to 150% at a temperature ranging from 10° C. to 50° C. The cold stretch percentage is determined using equation I above. After the cold stretch, hot stretching the film in the machine direction to a hot stretch ratio of from 50% to 500% at a temperature ranging from 90° C. to 110° C. The hot stretch percentage is determined using equation II above.

The films described herein do not use the addition of fillers like $CaCO_3$ in order to make moisture breathable films of high water vapor transmission rate. Accordingly, the films described herein comprise less than 5 wt. % of fillers, based on the total weight of polymers present in the film. Exemplary fillers may include, but are not limited to, $CaCO_3$, clay, silica, alumina, titania, zirconia, ceria, talc, magnesium carbonate, calcium sulfate, barium sulfate, porous glass beads, porous polymeric beads, ceramic beads, aluminum trihydroxide, magnesium trihydroxide, wollastonite whiskers, wood flour, lignin, starch, clay, carbon black, graphite, grapheme, carbon nanotube, carbon fibers, carbon nanofibers, or a combination thereof. In further embodiments, the described herein comprise less than 3 wt. % less than 2 wt. %, less than 1 wt. %, or less than 0.5 wt. % of fillers, based on the total weight of polymers present in the film.

The films described herein may incorporate other additives, such as, antioxidants (e.g., hindered phenolics, such as, IRGANOX® 1010 or IRGANOX® 1076, supplied by Ciba Geigy), phosphites (e.g., IRGAFOS® 168, also supplied by Ciba Geigy), processing aids, uv light stabilizers, thermal stabilizers, pigments, colorants, anti-stat additives, flame retardants, slip agents, antiblock additives, biocides, antimicrobial agents, and clarifiers/nucleators (e.g., HYPERFORM™ HPN-20E, MILLAD™ 3988, MILLAD™ NX 8000, available from Milliken Chemical). The other additives can be included in the film at levels typically used in the art to achieve their desired purpose. In some examples, the one or more additives are included in amounts ranging from 0-10 wt. %, based on total polymer weight of the film, 0-5 wt. %, based on total polymer weight of the film, 0.001-5 wt. %, based on total polymer weight of the film, 0.001-3 wt. %, based on total polymer weight of the film, 0.05-3 wt. %, based on total polymer weight of the film, or 0.05-2 wt. %, based on total polymer weight of the film. In embodiments herein, where fillers have other uses, e.g., colorants or pigments, they will still be present in a total amount of less than 5 wt. %.

Laminates

Also described herein are laminates. The laminates comprise a microporous film as previously described herein, and a nonwoven substrate at least partially bonded to the film. As used herein, "nonwoven substrates" include nonwoven webs, nonwoven fabrics and any nonwoven structure in which individual fibers or threads are interlaid, but not in a regular or repeating manner Nonwoven substrates described herein may be formed by a variety of processes, such as, for example, air laying processes, meltblowing processes, spun-bonding processes and carding processes, including bonded carded web processes.

The nonwoven web may comprise a single web, such as a spunbond web, a carded web, an airlaid web, a spunlaced web, or a meltblown web. However, because of the relative strengths and weaknesses associated with the different processes and materials used to make nonwoven fabrics, composite structures of more than one layer are often used in order to achieve a better balance of properties. Such structures are often identified by letters designating the various layers, such as, SM for a two layer structure consisting of a spunbond layer and a meltblown layer, SMS for a three layer structure, or more generically SXnS structures, where S is a spunbond layer, and X can be independently a spunbond layer, a carded layer, an airlaid layer, a spunlaced layer, or a meltblown layer and n can be any number, although for practical purposes is generally less than 5. In order to maintain structural integrity of such composite structures, the layers must be bonded together. Common methods of bonding include thermal calendar point bonding, adhesive lamination, ultrasonic bonding, and other methods known to those skilled in the art. All of these structures may be used in the present invention.

Articles

Also described herein are articles. The articles comprise a film or a laminate as previously described herein. In some embodiments, a breathable backsheet comprises a microporous film as previously described herein. In other embodiments, a breathable backsheet comprises a laminate. The articles may be used in a variety of hygiene and medical applications. In some embodiments, the articles may include diapers, training pants, and adult incontinence articles, or other similar absorbent garment article. In other embodiments, the articles may include medical drapes, gowns, and surgical suits, or in other fabric (woven or nonwoven) articles.

Test Methods

Density

Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index

Melt index ($I_2$) can be measured in accordance with ASTM D-1238, Procedure B (condition 190° C./2.16 kg).

Mercury Porosimetry

The mercury porosimetry analysis was performed on a Micromeritics Autopore IV 9520. The samples were mechanically out-gassed while under vacuum, at room temperature, prior to mercury analysis to remove any physio-sorbed species (i.e., moisture) from the sample's surface.

Test conditions include Hg fill pressure 0.50 psia, Hg contact angle 130°, Hg surface tension 485 dyn/cm, Hg density 13.53 g/mL, 30 minute evacuation time, small bore penetrometer (Solid type: 0.392 stem volume) with 5-cc bulb, 30 second equilibration time, 92-point pressure table (75 intrusion plus 17 extrusion pressure points), and mechanical evacuation <50-μm Hg. The low to high pressure cross over point was collected at approximately 46 psia (3.8 um). The pressure table used was generated to allow an even incremental distribution of pressures on a log scale from 0.5 to 60,000 psia and is used for detecting pore size from 0.003-400-μm diameter. Mercury is forced into smaller and smaller pores as pressure is increased incrementally from a vacuum to a maximum of nearly 60,000 psia.

To verify that the instrument was working properly, a Silica-Alumina reference material, lot A-501-46 was analyzed. The reported median pore diameter (volume) of the reference sample is 0.0072±0.0005-μm. The Autopore reported the median pore diameter (volume) to be 0.0072-μm.

Gel Permeation Chromatography (GPC)

For the GPC techniques used herein (Conventional GPC and Light Scattering GPC), a Triple Detector Gel Permeation Chromatography (3D-GPC or TDGPC) system was used. This system consisted of a PolymerChar (Valencia, Spain) GPC-IR High Temperature Chromatograph, equipped with a Precision Detectors (Now Agilent Technologies) 2-angle laser light scattering (LS) detector Model 2040, an IR5 infra-red detector and 4-capillary viscometer detector from PolymerChar. Data collection was performed using PolymerChar "Instrument Control" software. The system was also equipped with an on-line solvent degassing device from Agilent Technologies (CA, USA).

The eluent from the GPC column set flowed through each detector arranged in series, in the following order: IR5 detector, LS detector, then the Viscometer detector. The systematic approach for the determination of multi-detector offsets was performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below, in the paragraph following Equation (5).

Four 20-micron mixed-pore-size packing ("Mixed A", Agilent Technologies) are used for the separation. The PolymerChar Autosampler oven compartment was operated at 160° C. with low speed shaking for 3 hours, and the column compartment was operated at 150° C. The samples were prepared at a concentration of "2 milligrams per milliliter." The chromatographic solvent and the sample preparation solvent was 1,2,4-trichlorobenzene (TCB) containing "200 ppm of 2,6-di-tert-butyl-4methylphenol (BHT)." The solvent was sparged with nitrogen. The injection volume was 200 microliters. The flow rate through the GPC was set at 1 ml/minute. For this study, conventional GPC data and light scattering GPC data were recorded.

Conventional Gel Permeation Chromatography (GPC)

For Conventional GPC, the IRS detector ("measurement sensor") was used, and the GPC column set was calibrated by running 21 narrow molecular weight distribution polystyrene standards. The molecular weight (MW) of the standards ranged from 580 g/mol to 8,400,000 g/mol, and the standards were contained in 6 "cocktail" mixtures. Each standard mixture had at least a decade of separation between individual molecular weights. The standard mixtures were purchased from Polymer Laboratories (now Agilent Technologies). The polystyrene standards were prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards were dissolved at 80° C., with gentle agitation, for 30 minutes. The narrow standards mixtures were run first, and in order of decreasing highest molecular weight component, to minimize degradation. The polystyrene standard peak molecular weights were converted to polyethylene molecular weight using Equation (1) (as described in Williams and Ward, J. Polym. Sci., Polym. Letters, 6, 621 (1968)):

$$MW_{PE} = A \times (MW_{PS})^B \quad \text{(Eq. 1)}$$

where MW is the molecular weight of polyethylene (PE) or polystyrene (PS) as marked, and B is equal to 1.0. It is known to those of ordinary skill in the art that A may be in a range of about 0.38 to about 0.44 such that the A value yields 52,000 $MW_{PE}$ for Standard Reference Materials (SRM) 1475a. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$M_{n,cc} = \Sigma w_i / \Sigma (w_i / M_{cc,i}) \quad \text{(Eq. 2)}$$

$$M_{w,cc} = \Sigma w_i M_{cc,i} \quad \text{(Eq. 3)}$$

$$M_{z,cc} = \Sigma (w_i M_{cc,i}^2) / \Sigma (w_i M_{cc,i}) \quad \text{(Eq. 4)}$$

where $M_{n,cc}$, $M_{w,cc}$ and $M_{z,cc}$ are the number-, weight-, and z-average molecular weight obtained from the conventional calibration, respectively. $w_i$ is the weight fraction of the polyethylene molecules eluted at retention volume $V_i$. $M_{cc,i}$ is the molecular weight of the polyethylene molecules eluted at retention volume $V_i$ obtained using the conventional calibration (see Equation (1)).

With the conventional calibration, $w_i$ can be plotted against $\lg(M_{cc,i})$. Weight fraction of molecules with a molecular weight of 10,000 or less is calculated as $$\int_{\lg(M_{cc,i})=0}^{\lg(M_{cc,i})=4} w_i d_{\lg(M_{cc,i})}$$

Light Scattering (LS) GPC

For the LS GPC, the Precision Detector PDI2040 detector Model 2040 15° angle was used. The molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used in the determination of the molecular weight, was obtained from the mass detector (IRS) area, and the mass detector constant, derived from a suitable linear polyethylene homopolymer, or one of the polyethylene standards of known weight-average molecular weight. The calculated molecular weights were obtained using a light scattering constant, derived from one or more of the polyethylene standards mentioned below, and a refractive index concentration coefficient, dn/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards, such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight-average molecular weight ("$M_{w,abs}$") and absolute z-average molecular weight ("$M_{z,abs}$") is determined using Equations (5) and (6) below, using the "peak area" method (after detector calibration relating areas to mass and mass–molecular weight product) for higher accuracy and precision. The "LS.Area" and the "Concentration.Area" are generated by the chromatograph/detectors combination.

$$M_{w,abs} = \frac{\sum C_i M_{abs,i}}{\sum C_i} = \frac{\sum LS_i}{\sum C_i} = \frac{LS \cdot \text{Area}}{\text{Concentration} \cdot \text{Area}} \quad \text{(Eq. 5)}$$

$$M_{z,abs} = \sum (w_i M_{abs,i}^2) / \sum (w_i M_{abs,i}) \quad \text{(Eq. 6)}$$

where $C_i$ is the concentration of the polyethylene molecules in the eluant at the retention volume $V_i$, $M_{abs,i}$ is the absolute molecular weight of the polyethylene molecules at the retention volume $V_i$, $\Sigma LS_i$ (LS.Area) is the total response of the light scattering, and the $\Sigma C_i$ (Concentration.Area) is the total concentration.

For each LS profile, the x-axis (log $MW_{cc\text{-}GPC}$), where cc refers to the conventional calibration curve, is determined as follows. First, the polystyrene standards (see above) are used to calibrate the retention volume into "log $MW_{PS}$." Then, Equation (1) ($MW_{PE} = A \times (MW_{PS})^B$) is used to convert "log $MW_{PS}$" to "log $MW_{PE}$." The "log $MW_{PE}$" scale serves as the x-axis for the LS profiles of the experimental section (log $MW_{PE}$ is equated to the log MW). The y-axis for each LS profile is the LS detector response normalized by the injected sample mass. Initially, the molecular weight and intrinsic viscosity for a linear homopolymer polyethylene standard sample, such as SRM1475a or an equivalent, are determined using the conventional calibrations ("cc") for both molecular weight and intrinsic viscosity as a function of elution volume.

In the low molecular weight region of the GPC elution curve, the presence of a significant peak that is known to be caused by the presence of anti-oxidant or other additives, will cause an underestimation of the number average molecular weight (Mn) of the polymer sample, to give a overestimation of the sample polydispersity, defined as Mw/Mn, where Mw is the weight average molecular weight. The true polymer sample molecular weight distribution can therefore be calculated from the GPC elution by excluding this extra peak. This process is commonly described as the peak skim feature in data processing procedures in liquid chromatographic analyses. In this process, this additive peak is skimmed off from the GPC elution curve before the sample molecular weight calculation is performed from the GPC elution curve.

Differential Scanning Calorimetry (DSC) of Blown Films

The samples were weighed and sealed in an aluminum hermetic (P/N 900793.901 pan and 900794.901 lid) DSC pan. The sample weights were roughly 2 to 5 mg for each sample. The samples were scanned in a TA Instruments Q2000 DSC (Differential Scanning calorimeter) (P/N 970001.901) (S/N 2000.0884) with an autosampler, nitrogen purge of 50 ml/min and mechanical cooling accessory. The run parameters for the ramped samples were 0° C. to 200° C. at 10° C./min for a heat-cool-heat cycle. The scans were analyzed using Universal Analysis V4.7A software. The finished scanned samples did not lose any significant weight.

Water Vapor Transmission Rate (WVTR) Measurement

WVTR of the films was tested using a MOCON 101K at 38° C. and 100% relative humidity (RH) according to ASTM D6701-01. For each piece of stretched film, one specimen was cut from the center area of the stretched films for the WVTR test. Two specimens were tested to obtain an average WVTR value for each sample. The lower detection limit for MOCON 101K is 32 g/(100 inch$^2$·day). "NM" means that the WVTR of the sample is too low to be accurately measured with the MOCON 101K unit.

Normalized WVTR was obtained according to the equation:

Normalized WVTR=WVTR×Film Thickness.

EXAMPLES

TABLE 1A

Resin Properties

| Polymer Resins | Density (g/cm$^3$) | $I_2$ (g/10 min) |
|---|---|---|
| Inventive HDPE 1 (available as DMDA-6400 from The Dow Chemical Company) | 0.963 | 0.8 |
| Comparative HDPE A (available as ELITE ™ 5960G from The Dow Chemical Company) | 0.964 | 0.85 |
| Comparative HDPE B (available as DMDA-6200 from The Dow Chemical Company) | 0.955 | 0.38 |
| Comparative HDPE C (process conditions are listed below) | 0.957 | 1.0 |
| Comparative LLDPE X (available as DOWLEX ™ 2042E from The Dow Chemical Company) | 0.930 | 1.0 |
| Comparative LLDPE Y (available as DOWLEX ™ 2045G from The Dow Chemical Company) | 0.920 | 1.0 |

TABLE 1B

Resin Properties

Conventional GPC

| | $M_{n, cc}$ (g/mol) | $M_{w, cc}$ (g/mol) | $M_{z, cc}$ (g/mol) | $M_{w, cc}/M_{n, cc}$ | Wt. % of molecules with a molecular weight of 1 × 10$^4$ or less |
|---|---|---|---|---|---|
| Inv. HDPE 1 | 12,808 | 109,672 | 621,184 | 8.6 | 17.2 |
| Comp. HDPE A | 21,624 | 107,011 | 303,585 | 4.9 | 10.8 |
| Comp. HDPE B | 13,520 | 129,915 | 751,383 | 9.6 | 15.2 |
| Comp. HDPE C | 48,622 | 103,378 | 183,587 | 2.1 | 1.9 |
| Comp. LLDPE X | 26,924 | 113,917 | 355,542 | 4.2 | 8.1 |
| Comp. LLDPE Y | 27,110 | 116,464 | 388,312 | 4.3 | 7.4 |

TABLE 1C

Resin Properties

Light Scattering GPC

| | $M_{n, abs}$ (g/mol) | $M_{w, abs}$ (g/mol) | $M_{z, abs}$ (g/mol) | $M_{z, abs}/M_{w, abs}$ |
|---|---|---|---|---|
| Inv. HDPE 1 | 11,183 | 111,190 | 640,760 | 5.8 |
| Comp. HDPE A | 20,366 | 112,371 | 357,492 | 3.2 |
| Comp. HDPE B | 11,511 | 129,860 | 732,692 | 5.6 |
| Comp. HDPE C | 49,023 | 108,538 | 191,269 | 1.8 |
| Comp. LLDPE X | 29,211 | 121,166 | 355,074 | 2.9 |
| Comp. LLDPE Y | 27,604 | 121,750 | 439,081 | 3.6 |

Comparative HDPE C Process Conditions

For comparative HDPE resin C, all raw materials (monomer and comonomer) and the process solvent (a narrow boiling range, high-purity isoparaffinic solvent) were purified with molecular sieves, before introduction into the reaction environment. Hydrogen was supplied in pressurized cylinders, as a high purity grade, and was not further purified. The reactor monomer feed stream was pressurized, via a mechanical compressor, to above reaction pressure. The solvent and comonomer feed was pressurized, via a pump, to above reaction pressure. The individual catalyst components were manually batch diluted with purified solvent, and pressured to above reaction pressure. All reaction feed flows were measured with mass flow meters, and independently controlled with computer automated valve control systems. The fresh comonomer feed (if required) was mechanically pressurized and injected into the feed stream for the reactor.

The continuous solution polymerization reactor consisted of a liquid full, non-adiabatic, isothermal, circulating, loop reactor, which is similar a continuously stirred tank reactor (CSTR) with heat removal. Independent control of all fresh solvent, monomer, comonomer, hydrogen, and catalyst component feeds was possible. The total fresh feed stream to the reactor (solvent, monomer, comonomer, and hydrogen) was temperature controlled, by passing the feed stream through a heat exchanger. The total fresh feed to the polymerization reactor was injected into the reactor at two locations, with approximately equal reactor volumes between each injection location. The fresh feed was controlled, with each injector receiving half of the total fresh feed mass flow.

The catalyst components were injected into the polymerization reactor, through a specially designed injection stinger, and were combined into one mixed catalyst/cocatalyst feed stream, prior to injection into the reactor. The primary catalyst component feed was computer controlled, to maintain the reactor monomer conversion at a specified target. The cocatalyst components were fed, based on calculated specified molar ratios to the primary catalyst component Immediately following each fresh injection location (either feed or catalyst), the feed streams were mixed, with the circulating polymerization reactor contents, with static mixing elements. The contents of the reactor were continuously circulated through heat exchangers, responsible for removing much of the heat of reaction, and with the temperature of the coolant side, responsible for maintaining an isothermal reaction environment at the specified temperature. Circulation around the reactor loop was provided by a pump. The final reactor effluent entered a zone, where it was deactivated with the addition of, and reaction with, a suitable reagent (water). At this same reactor exit location, other additives may also be added.

Following catalyst deactivation and additive addition, the reactor effluent entered a devolatization system, where the polymer was removed from the non-polymer stream. The isolated polymer melt was pelletized and collected. The non-polymer stream passed through various pieces of equipment, which separate most of the ethylene, which was removed from the system. Most of the solvent and unreacted comonomer was recycled back to the reactor, after passing through a purification system. A small amount of solvent and comonomer was purged from the process. The process conditions in the reactor are summarized in Tables 2 and 3.

TABLE 2

| Catalyst information | |
|---|---|
| Cat. A | (tert-butyl(dimethyl(3-(pyrrolidin-1-yl)-1H-inden-1-yl)silyl)amino)dimethyltitanium |
| Co-Cat. B | Amines, bis(hydrogenated tallow alkyl)methyl, tetrakis(pentafluorophenyl)borate(1-) |
| Co-Cat. C | Aluminoxanes, iso-Bu Me, branched, cyclic and linear; modified methyl 3A aluminoxane |

TABLE 3

| Process Conditions for Comp. HDPE C | | |
|---|---|---|
|  | Units | Comp. HDPE C |
| Reactor Configuration |  | Single Reactor |
| Comonomer |  | 1-octene |
| Reactor Total Solvent Flow | lb/hr | 2381 |
| Reactor Total Ethylene Flow | lb/hr | 354 |
| Reactor Total Comonomer Flow | lb/hr | 1.9 |
| Reactor Hydrogen Feed Flow | SCCM | 4659 |
| Reactor Control Temperature | ° C. | 150 |
| Reactor Ethylene Conversion | % | 85.5 |
| Reactor Viscosity | centi-Poise | 223 |
| Reactor Catalyst | type | Cat. A |
| Reactor Co-catalyst 1 | type | Co-Cat. B |
| Reactor Co-catalyst 2 | type | Co-Cat. C |
| Reactor Catalyst Efficiency | gram Polymer per gram catalyst metal | $6.36 \times 10^6$ |
| Reactor Cocatalyst to Catalyst Metal Molar Ratio | Ratio | 1.4 |
| Reactor Scavenger to Catalyst Metal Molar Ratio | Ratio | 8.0 |

Blown Films 1-mil blown films were made using a Dr. Collin blown film line. The line was comprised of three 25:1 L/D single screw extruders, equipped with grooved feed zones. The same material was fed into the three extruders at the same time in order to make mono-layer films. The screw diameters were 25 mm for the inner layer, 30 mm for the core layer, and 25 mm for the outer layer. The annular die was 60 mm in diameter and used a dual lip air ring cooling system. The die lip gap was set at 2 mm and the blow up ratio (BUR) was 2.5. The lay flat was around 23 to 24 cm. Frost line height was set at 5.5 inches. Melt temperature and throughput rate are shown in Table 4 below.

TABLE 4

| Blown Film Conditions | | | |
|---|---|---|---|
| Resin | Film | Melt Temperature (° C.) | Total Throughput rate (Kg/hour) |
| Inv. HDPE 1 | Inv. 1 | 252 | 8.4 |
| Comp. HDPE B | Comp. B | 253 | 8.6 |
| Comp. HDPE C | Comp. C | 252 | 8.1 |
| Comp. LLDPE X | Comp. X | 215 | 8.8 |
| Comp. LLDPE Y | Comp. Y | 212 | 8.8 |

The blown films were annealed at a predetermined temperature in a vacuum oven (Precision Scientific, CR-00643) under a vacuum level of 28 inch Hg for a period of time. The annealing temperature (about 10-15° C. lower than the melting temperature) was determined by differential scanning calorimetry data for each polymer.

After annealing, the film was cut into pieces with a dimension of 5" (machine direction, MD)×6'" (transverse direction, TD). Metal shims were attached to both edges of the film along the machine direction using a tape. The metal shims were used to allow the stretching force to be uniformly distributed across the film width. The film with metal shims was then loaded onto the grids of Iwamoto biaxial stretcher. The original film length before stretching is 100 mm. The film was subjected to cold stretching by 50%, which is defined by $$\frac{\text{Total Length after Cold Stretching} - \text{Original Film Length}}{\text{Original Film Length}} \times 100\%,$$

at a rate of 100 mm/s (100%/s). After that, the door of sample chamber was closed and the sample chamber was heated to 100° C., followed by holding at this temperature for 1 minute. Subsequently, the film was subjected to hot stretching by 300%, which is defined by $$\frac{\text{Total Length after Hot Stretching} - \text{Total Length after Cold Stretching}}{\text{Original Film Length}} \times 100\%,$$

for solid films at a rate of 4 mm/s (4%/s).

TABLE 5A

| Film Processing Parameters | | | | | |
|---|---|---|---|---|---|
| Blown Film | Melt Temperature by DSC ° C. | Anneal Temperature ° C. | Anneal Time hour | Cold Stretch Temperature ° C. | Hot Stretch Temperature ° C. |
| Inv. 1 | 134.0 | 120 | 24 | 25 | 100 |
| Comp. B | 130.8 | 115 | 24 | 25 | 95 |
| Comp. C | 135.0 | 120 | 24 | 25 | 100 |
| Comp. X | 123.3 | 95 | 24 | 25 | 90 |
| Comp. Y | 123.8 | 95 | 24 | 25 | 90 |

TABLE 5B

Final Film Characteristics

| Blown Film | Final Film Thickness mil | Porosity % | Average Pore Size nm |
|---|---|---|---|
| Inv. 1 | 0.36 | 40.7 | 95.9 |
| Comp. B | 0.36 | 12.2 | 17.7 |
| Comp. C | 0.15 | 22.2 | 51.1 |
| Comp. X | 0.62 | 5.6 | 5.8 |
| Comp. Y | 0.54 | 4.5 | 5.8 |

TABLE 6

Normalized WVTR for the Blown Films

| Blown Film | Normalized WVTR g · mil/(100 inch$^2$ · day) |
|---|---|
| Inv. 1 | 345 |
| Comp. B | 0 (NM*) |
| Comp. C | 5.3 |
| Comp. X | 0 (NM*) |
| Comp. Y | 0 (NM*) |

*NM—Not Measurable (lower detection limit of Mocon 101 K is 32 g/(100 inch$^2$ · day)

Cast Films

Cast films were prepared using inventive resin 1 and comparative HDPE resin A, on a film cast line, which consisted of a 1.25-inch Killion single-screw extruder and an 8-inch wide cast die with a die gap of about 30 mil. The temperature profile used for making solid cast films is shown in Table 7 below. The process conditions are reported in Table 8 below. Inventive 1 and Comparative A films were formed from inventive resin 1 and comparative HDPE resin A, respectively.

TABLE 7

Temperature profile for making solid cast films.

| Extruder Zone 1 (° C.) | Extruder Zone 2 (° C.) | Extruder Zone 3 (° C.) | Die 1 (° C.) | Die 2 (° C.) |
|---|---|---|---|---|
| 177 | 210 | 216 | 216 | 216 |

TABLE 8

Processing conditions for making solid cast films.

| Chill Roll Temperature (° C.) | Gear Pump Speed (rpm) | Line Speed (ft/min) | Extrusion Pressure (psi) | Film Width (inch) |
|---|---|---|---|---|
| 77 | 30 | 43.8 | 2400 | 7 |

The stretching conditions of cast films follow the same procedure as blown films. The cast films were annealed at a predetermined temperature in a vacuum oven (Precision Scientific, CR-00643) under a vacuum level of 28 inch Hg for a period of time. The annealing temperature (about 10-15° C. lower than the melting temperature) was determined by differential scanning calorimetry data for each polymer.

After annealing, the films were cut into pieces with a dimension of 5" (machine direction, MD)×6" (transverse direction, TD). Metal shims were attached to both edges of the film along the machine direction using a tape. The metal shims were used to allow the stretching force to be uniformly distributed across the film width. The film with metal shims was then loaded onto the grids of Iwamoto biaxial stretcher. The original film length before stretching is 100 mm. The film was subjected to cold stretching by 50%, which is defined by $$\frac{\text{Total Length after Cold Stretching} - \text{Original Film Length}}{\text{Original Film Length}} \times 100\%,$$

at a rate of 100 mm/s (100%/s). After that, the door of sample chamber was closed and the sample chamber was heated to 100° C., followed by holding at this temperature for 1 minute. Subsequently, the film was subjected to hot stretching by 300%, which is defined by $$\frac{\text{Total Length after Hot Stretching} - \text{Total Length after Cold Stretching}}{\text{Original Film Length}} \times 100\%,$$

for solid films at a rate of 4 mm/s (4%/s).

TABLE 9A

Film Processing Parameters

| Cast Film | Anneal Temperature ° C. | Anneal Time hour | Cold Stretch Temperature ° C. | Hot Stretch Temperature ° C. |
|---|---|---|---|---|
| Inventive 1 | 120 | 24 | 25 | 100 |
| Comparative A | 120 | 24 | 25 | 100 |

TABLE 9B

Final Film Characteristics

| Cast Film | Final Film Thickness mil | Porosity % | Average Pore Size nm |
|---|---|---|---|
| Inventive 1 | 0.80 | 49.5 | 96.5 |
| Comparative A | 0.75 | 10.7 | 11.6 |

TABLE 10

Normalized WVTR for the Cast Films

| Cast Film | Normalized WVTR g mil/(100 inch$^2$ · day) |
|---|---|
| Inventive 1 | 588 |
| Comparative A | 0 (NM*) |

*NM—Not Measurable (lower detection limit of Mocon 101 K is 32 g/(100 inch$^2$ · day)

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A microporous film comprising:
   75 wt. % or greater of a high density polyethylene resin having a density of 0.957 g/cc-0.970 g/cc, a melt index of from 0.2 to 10 g/10 minutes, a molecular weight distribution, $M_{w,cc}/M_{n,cc}$, of greater than or equal to 6.0, and a Mz,abs of greater than or equal to 500,000 g/mol;
   wherein the microporous film is oriented in the machine direction and exhibits a normalized WVTR greater than 50 g mil/(100 in$^2$·day).

2. The film of claim 1, wherein the high density polyethylene resin has greater than 5 wt. % of molecules with a molecular weight of $1 \times 10^4$ or less.

3. The film of claim 1, wherein the film comprises less than 5 wt. % of filler.

4. The film of claim 1, wherein the film comprises 95 wt. % or greater of the high density polyethylene.

5. A breathable backsheet comprising the film of claim 1.

6. The film of claim 1, wherein the film is cold stretched in the machine direction, and after the cold stretch, the film is hot stretched in the machine direction.

7. The film of claim 6, wherein the cold stretch percentage, $$\frac{\text{Total Length after Cold Stretching} - \text{Original Film Length}}{\text{Original Film Length}} \times 100\%,$$

is from 25% to 150%.

8. The film of claim 6, wherein the cold stretch is performed at a temperature ranging from 10° C. to 50° C.

9. The film of claim 6, wherein the hot stretch percentage, $$\frac{\text{Total Length after Hot Stretching} - \text{Total Length after Cold Stretching}}{\text{Original Film Length}} \times 100\%,$$

is from 50% to 500%.

10. The film of claim 6, wherein the hot stretch is performed at a temperature ranging from 90° C. to 110° C.

11. A method of manufacturing a microporous film, the method comprising:
    providing a film comprising 75 wt. % or greater of a high density polyethylene resin having a density of 0.955 g/cc 0.970 g/cc, a melt index of from 0.2 to 10 g/10 minutes, a molecular weight distribution, $M_{w,cc}/M_{n,cc}$, of greater than or equal to 6.0, and a M z,abs of greater than or equal to 500,000 g/mol measured by triple detector GPC;
    cold stretching the film in the machine direction to a cold stretch percentage, $$\frac{\text{Total Length after Cold Stretching} - \text{Original Film Length}}{\text{Original Film Length}} \times 100\%, ,$$

of from 25% to 150% at a temperature ranging from 10° C. to 50° C.;
    after the cold stretch, hot stretching the film in the machine direction to a hot stretch percentage, $$\frac{\text{Total Length after Hot Stretching} - \text{Total Length after Cold Stretching}}{\text{Original Film Length}} \times 100\%,$$

of from 50% to 500% at a temperature ranging from 90° C. to 110° C.

* * * * *